United States Patent [19]

Strähle et al.

[11] Patent Number: 5,605,190
[45] Date of Patent: Feb. 25, 1997

[54] HEAT ACCUMULATOR, IN PARTICULAR FOR LATENT HEAT, AND METHOD OF MANUFACTURE OF THE SAME

[75] Inventors: Roland Strähle, Unterensingen; Stephan Hörz, Filderstadt; Henryk Bednarek, Landsberg, all of Germany

[73] Assignees: Längerer & Reich GmbH & Co, Filderstadt; Bayrische Motoren Werke Aktiengesellschaft, Munich, both of Germany

[21] Appl. No.: 403,890

[22] PCT Filed: Sep. 27, 1993

[86] PCT No.: PCT/DE93/00918

§ 371 Date: Mar. 16, 1995

§ 102(e) Date: Mar. 16, 1995

[87] PCT Pub. No.: WO94/08195

PCT Pub. Date: Apr. 14, 1994

[30] Foreign Application Priority Data

Sep. 29, 1992 [DE] Germany ............... 42 32 556.0

[51] Int. Cl.⁶ ............................................. F28D 17/00
[52] U.S. Cl. .......................................... 165/10; 29/890.06
[58] Field of Search ...................... 29/890.032, 890.06; 165/10

[56] References Cited

U.S. PATENT DOCUMENTS

| | | | |
|---|---|---|---|
| 4,388,963 | 6/1983 | Campbell | 165/10 |
| 4,561,493 | 12/1985 | Yanadori et al. | 165/10 |
| 4,799,364 | 1/1989 | Meier et al. | 165/10 X |
| 5,036,904 | 8/1991 | Kanda et al. | 165/10 |
| 5,074,283 | 12/1991 | Beatty et al. | 165/10 X |
| 5,090,474 | 2/1992 | Schatz | 165/10 |
| 5,199,484 | 4/1993 | Schatz | 165/10 |
| 5,222,298 | 6/1993 | Schatz | 165/10 X |
| 5,251,688 | 10/1993 | Schatz | 165/10 |

FOREIGN PATENT DOCUMENTS

| | | | |
|---|---|---|---|
| 2667934 | 4/1992 | France . | |
| 3614318 | 10/1987 | Germany | 165/10 |
| 4020859 | 1/1992 | Germany . | |
| 57-35292 | 2/1982 | Japan | 165/10 |

*Primary Examiner*—John Rivell
*Assistant Examiner*—Christopher Atkinson

[57] ABSTRACT

A heat accumulator, in particular latent-heat accumulator, has an inner casing containing an accumulator core and with an outer casing enclosing the inner casing at a distance thereto so as to form an insulation space, the insulation space being baked out and evacuated. The inner casing has a pipe connection with a fill opening through which the storage medium can b introduced and which can be closed by a mechanical closing element after the storage medium has been introduced. The outer casing has a pipe connection with a fill opening through which the insulation space can be filled with insulating medium and or evacuated and which can be closed by a mechanical closing element. The pipe connection of the inner casing is disposed coaxially to the pipe connection of the outer casing. This simplifies manufacture of the heat accumulator.

9 Claims, 1 Drawing Sheet

HEAT ACCUMULATOR, IN PARTICULAR FOR LATENT HEAT, AND METHOD OF MANUFACTURE OF THE SAME

BACKGROUND OF THE INVENTION

The present invention relates to a heat accumulator, and particularly for latent heat.

More particularly, it relates to a heat accumulator which has an inner casing having an accumulator core with a storage medium, and an outer casing surrounding the inner casing at a distance thereto to form an insulation space therebetween. The present invention also deals with a method of manufacture of the heat accumulator.

In a heat accumulator known from DE-40 20 859 A1 the insulation space formed between the inner casing and outer casing is baked out and evacuated to remove gases. Evacuation is effected in order to achieve the best possible insulation by keeping losses as low as possible in the heat accumulator. It is known that substances such as $H_2O$, $H_2$ or the like evolving under vacuum from the walls forming the boundary of the insulation space retard the evacuation process. For this reason, the insulation space is baked out so that these substances can be sucked out more quickly. Baking out is effected after the housing of the heat accumulator has been completed and the storage medium has been introduced into the accumulator core. A reasonable baking out temperature for the insulation space often lies above the maximum permissible temperature of the storage medium so that there is a risk of damaging the storage medium by excessive temperatures. Therefore, steps are taken in a heat accumulator to insulate the accumulator core from the insulation space by protective devices during bake-out and accordingly to prevent overheating of the storage medium. Such protective devices are costly. Cooling measures for protecting the storage medium against damage during baking out are likewise costly.

Further, a heat accumulator is known (FR-26 67 934, A1) in which the insulation space is baked out before introducing the storage medium and the storage medium is introduced only after the baking out process. The risk of damage to the storage medium is avoided in this way and protective devices, e.g., for cooling the storage medium or protecting it from excessive temperatures during baking out, can be dispensed with. Further, a higher temperature can be selected for baking out the insulation space. In this known heat accumulator, the pipe connection having a fill opening through which the inner casing is filled with the storage medium extends from the inner casing through the insulation space and outer casing to the outside. The external fill opening of the pipe connection can be closed by a closing element. Further, an alternative solution in this heat accumulator consists in that the pipe connection of the inner casing whose fill opening is closed by a closing element is located in the interior of a feed line or outlet line through which the operating medium can be fed to or removed from the accumulator core during operation of the heat accumulator. In this construction, the only access to the fill opening of the inner casing is through the feed line or outlet line and is accordingly difficult. The other construction in which the pipe connection proceeds from the inner casing and passes through the insulation space and outer casing involves drawbacks for the manufacture of the heat accumulator. For example, insertion of the accumulator core in the outer casing becomes difficult. A further disadvantage in the known heat accumulator consists in that it is sometimes difficult to introduce the storage medium into the accumulator core. Special steps for introducing the insulating medium in the insulation space are not provided in the known heat accumulator.

SUMMARY OF THE INVENTION

Accordingly, it is an object of the present invention to provide a heat accumulator, in particular for latent heat, which avoids the disadvantages of the prior art.

In keeping with these objects and with others which will become apparent hereinafter, one feature of the present invention resides, briefly stated, in a latent heat accumulator with an inner casing having a pipe connection with a fill opening for introducing the storage medium, wherein in accordance with the present invention the outer casing has a pipe connection with a fill opening through which insulation space can be filled with insulating medium and/or evacuated and which can be closed by a mechanical closing element, so that the pipe connection of the inner casing is located coaxially to the pipe connection of the outer casing.

When the heat accumulator, in particular for latent heat, is designed in accordance with the present invention it eliminates the disadvantages of the prior art and provides for the above mentioned advantageous results.

In accordance with further features of the present invention, the pipe connection of the inner casing can end before reaching the pipe connection of the outer casing. The closing element of the pipe connection of the inner casing can be located within the insulation space. The closing element of the pipe connection of the outer casing can be formed by a closing cap which can be screwed on or by a closing screw which can be screwed on. A sealing element can be arranged between the closing element of the pipe connection of the inner casing and this pipe connection and provided with the fill opening. The sealing element can be formed from a non-hygroscopic plastic. The closing element can be formed by a closing member which can be fastened by application of heat. The pipe connections of the inner casing and the outer casing can be arranged in special ways. Introduction of the accumulator core into the outer casing is simplified in that the pipe connections of the inner casing and outer casing are separate, which already enables a simpler manufacture of the heat accumulator, particularly when the pipe connection of the inner casing ends before reaching the pipe connection of the outer casing, because the accumulator core can be inserted into the outer casing more quickly and simply due to the axial distance between the pipe connections.

A further advantage consists in that the introduction of the storage medium into the accumulator core is facilitated. The introduction of the insulating medium into the insulation space is likewise easier and simpler to carry out. If the insulation space need only be evacuated and not filled with insulating medium, this evacuation of the insulation space via the pipe connection of the outer casing is also simpler, easier and less expensive to carry out. Another advantage consists in that it is considerably easier to test for tightness in this construction of the heat accumulator.

In accordance with a further feature of the present invention a process for manufacture of a heat accumulator is proposed, in accordance with which the baked out insulation space is closed at least temporarily before introducing the storage medium, and preferably the insulation space can be filled with an inert substance if necessary and before final closing. With this method, during manufacture it is possible to bake out and evacuate the insulation space first in a simple, reliable manner and in special cases the insulation space may be closed temporarily, when necessary, by the closing element so as to prevent any new impurities from entering the insulation space after baking out and evacuating. In such cases, the insulation space can also be filled with an inert substance. If required, the heat accumulator can be tested for tightness after baking out and evacuating, for example, by helium pressure testing or some other method. The storage medium is introduced only after baking out the insulation space, whereupon the opening, e.g., in the respective pipe connection of the inner casing, for introducing the storage medium can be closed, preferably so as to be vacuum-tight. The insulation layer can then be provided in the insulation space in a simple manner either by evacuating the insulation space again or by introducing an insulating medium and carrying out an additional evacuation of the insulation space. When an insulating medium is introduced it is advisably preheated, i.e., baked out separately before being introduced, for instance, by heating it to a temperature above 200° C., so as to remove any air and moisture components from the insulating medium. The insulating medium can then be introduced into the insulation space in a hermetically sealed vacuum region having the same vacuum pressure as that prevailing in the insulation space. The insulation space is then hermetically closed. These work steps can be carried out quickly and easily so that a heat accumulator can be produced in this way in a simple and inexpensive manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
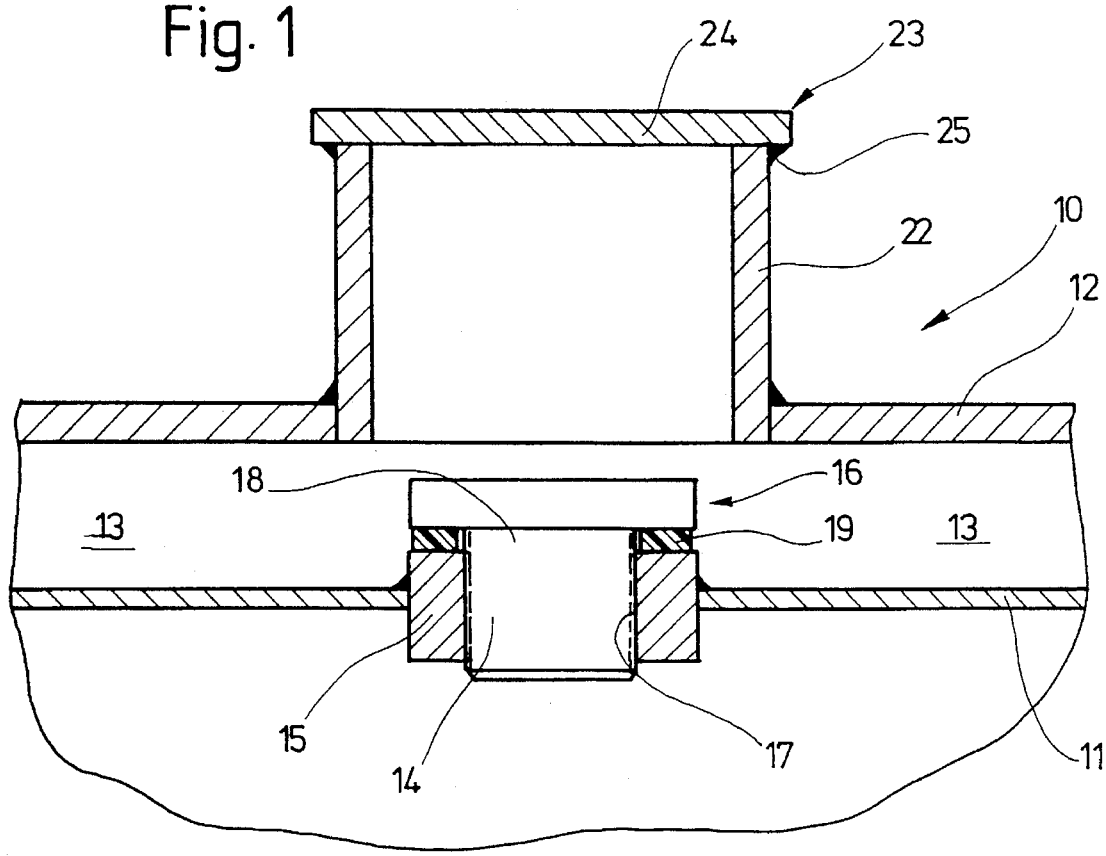
FIG. 1 shows a schematic section of a portion of a heat accumulator according to a first embodiment example.

FIG. 1 is a schematic view of a portion of a heat accumulator 10, in particular a latent-heat accumulator which may be constructed cylindrically, for instance, or can have any other external shape. The heat accumulator 10 can be arranged in the space in an optional orientation. In its interior, it has an accumulator core, not shown in particular, which forms the device serving to store heat and is enclosed by an inner casing 11 which is only indicated schematically. The inner casing 11 is made of metal, e.g., aluminum. It is enclosed at a distance by an outer casing 12. Because of this distance, an insulation space 13 is formed between the inner casing 11 and outer casing 12, this insulation space 13 being filled with an insulating medium and/or evacuated.

Further, the heat accumulator 10 has lines, e.g., pipelines, not visible in FIG. 1, which lead through the insulation space 13, one of which serves as an inlet line and the other as a return line for a heat transporting medium, e.g., the cooling water of an internal combustion engine.

A storage medium, e.g., a suitable salt, is contained in the accumulator core located inside the inner casing 11.

The inner casing 11 is provided with a fill opening 14 which is defined in this instance by a pipe connection 15 which is fastened to the inner casing 11 so as to be vacuum-tight and is welded on in particular. The storage medium is introduced to the interior of the inner casing 11, in particular in the accumulator core, via the fill opening 14, in particular the pipe connection 15. The fill opening can then be closed by a mechanical closing element 16. In the first embodiment example in FIG. 1, this closing element 16 of the pipe connection 15 is formed by a closing screw 18 which can be screwed into an internal thread 17 of the pipe connection 15. A closing cap which can be screwed onto an external thread of the pipe connection 15 could also be provided instead. The closing of the fill opening 14 achieved by the closing element 16 must be vacuum-tight. Therefore, a sealing element 19 suitable for vacuum, e.g., a sealing ring, is arranged between the closing element 16 and the upper side of the pipe connection 15. The sealing element 19 is formed, e.g., from a nonhygroscopic plastics material.

The outer casing 12 is provided with a pipe connection 22 which is attached thereto so as to be vacuum-tight and extends coaxially to the pipe connection 15 of the inner casing 11. The pipe connection 15 of the inner casing 11 is dimensioned in such a way that it ends before reaching the pipe connection 22 of the outer casing 12. The closing element 16 of the pipe connection 15 of the inner casing 11 is accordingly located within the insulation space 13.

The insulation space 13 can be closed so as to be vacuum-tight in the region of the pipe connection 22, in particular at its upper end as seen in FIG. 1, after introducing an insulating medium and/or after evacuation. A mechanical closing element 23 is used for this purpose. In the first embodiment example in FIG. 1, this closing element 23 is formed by a closing member 24, e.g., a plate, cap or the like, which can be fastened by application of heat, in particular by welding. The plate-shaped closing member 24 is placed on the front end of the pipe connection 22 and is securely connected with the latter so as to be vacuum-tight by weld 25 which is indicated schematically.

It will be understood that the closing element 23 at pipe connection 22 can be constructed in a modified embodiment example in precisely the same manner as the closing element 16 at pipe connection 15. In another embodiment example, not shown, the closing element 16 at pipe connection 15 can also be constructed in the same manner as closing element 23 at pipe connection 22.

The heat accumulator 10 is manufactured in the following manner. First, mechanical production of the heat accumulator 10 is completed, although closing element 16 and closing element 23 are not yet attached. The insulation space 13 is provided so as to minimize losses in the storage of heat. For this purpose, the insulation space 13 is conventionally filled with an insulating medium and evacuated or is only evacuated so as to achieve vacuum insulation. It has been proven that substances evolving under vacuum in the insulation space 13, e.g., $H_2O$ and $H_2$, retard the evacuation process. For this reason, it is known to bake out and evacuate the insulation space 13 after mechanical completion of the housing of the heat accumulator 10 for the purpose of removing gases. In a known process, this baking out is effected after the accumulator core has been filled with storage medium. In known methods, a reasonable baking out temperature often lies above the maximum permissible temperature of the storage medium which is accordingly damaged when this baking out is effected according to known methods, even when the accumulator core is thermally insulated relative to the insulation space 13 during bake-out.

In the heat accumulator 10 according to the present invention, the invention provides a process in which the insulation space 13 is first baked out and evacuated before introducing the storage medium in the region enclosed by the inner casing 11, in particular in the accumulator core. This prevents any risk of damaging the storage medium due to high temperatures. There is no need for any special protective devices for preventing the danger of overheating of the storage medium. Other costly steps for protecting the storage medium, e.g., cooling arrangements, are also dispensed with. Under certain circumstances, higher baking out temperatures, e.g., above 200° C., can be selected for baking out the insulation space 13 because, due to the fact that the heat accumulator has not yet been filled with the storage medium and accordingly comprises only construction material which can be heated to greater temperatures than the storage medium, higher temperatures can be used for baking out. If necessary, the heat accumulator 10 can be subjected to tightness testing after the insulation space 13 is baked out, e.g., pressure testing with an inert gas such as helium.

The storage medium is introduced through the fill opening 14 of the pipe connection 15 only after baking out the insulation space 13. If there is a risk of new impurities entering the insulation space 13 when filling with the storage medium, the insulation space 13 can be filled with an inert substance. A vacuum can be maintained in the baked out insulation space 13 while the storage medium is introduced into the fill opening 14. The storage medium, in particular salt, is advantageously introduced in such a way that it is either already in a liquid state when inserted or is liquified, for instance, by the heat remaining in the heat accumulator 10 after baking out the insulation space 13, which heats and liquifies the introduced storage medium. In every case, the introduced storage medium is heated at most to operating temperature and not above this operating temperature. As the storage medium is liquid when introduced, all spaces in the matrix of the accumulator core in the space enclosed by the inner casing 11 are well filled with the storage medium in a uniform manner. After introducing the storage medium, the fill opening 14 in the pipe connection 15 is preferably closed in a vacuum-tight manner by attaching the closing element 16. Subsequently, the insulating layer is produced in the insulation space 13. This insulating layer is either a vacuum insulation or is effected by introducing an insulating medium with additional vacuum. In the case of pure vacuum insulation, the insulation space 13 is evacuated again and then closed in a vacuum-tight manner by the closing element 23. If the insulating layer is formed by insulating medium with additional vacuum in the insulation space 13, the insulation space 13 is likewise evacuated. The insulating medium to be introduced into the insulation space 13 is advantageously also baked out before insertion, e.g., by heating to 200° C., so that air and moisture components are expelled from the insulating medium. The insulating medium which is baked out in this way is then placed in the insulation space 13, e.g., in a hermetically sealed vacuum region having the same vacuum pressure as that prevailing in the insulation space 13 and which is connected to the insulation space 13, and the insulating medium is accordingly baked out and introduced under vacuum in the insulation space 13. In this way, the best possible insulation is achieved within the insulation space 13. Powder and/or fibers of an insulating material, for instance, are introduced as insulating medium. If necessary, this material can contain radiation inhibitors, in particular carbon black, so as to eliminate heat radiation as far as possible. After the evacuation of the insulation space 13 or, alternatively, after introducing the insulating medium into the insulation space 13 under vacuum, the insulation space 13 is closed so as to be vacuum-tight by the closing element 23. For example, the closing element 23 is welded on under vacuum, e.g., by electron beam welding. The vacuum prevailing in the insulation space 13 is accordingly maintained.

Figure 2:
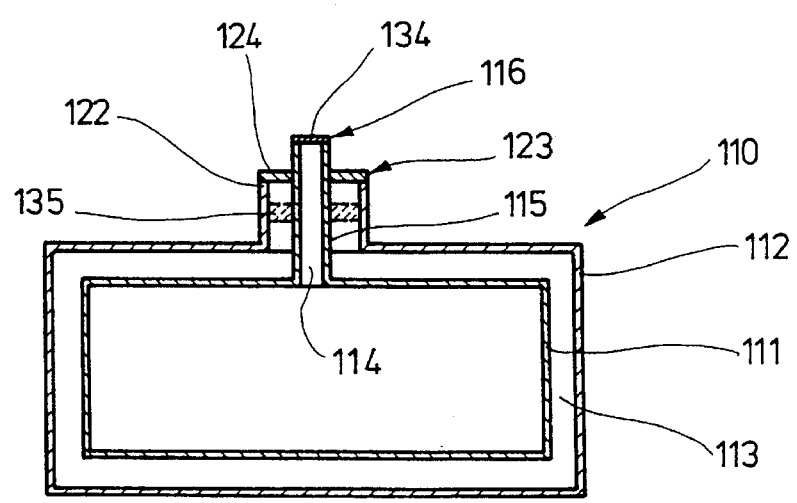
FIG. 2 shows a schematic section of a heat accumulator according to a second embodiment example.

In the second embodiment example shown in FIG. 2, reference numbers referring to parts corresponding to those in the first embodiment examples are simply increased by 100 so as to avoid repeating the description of the first embodiment example.

In the heat accumulator 110 shown in FIG. 2, an insulation space 113 is again formed between the outer casing 112 and the inner casing 111. The second embodiment example differs from the first in that the pipe connection 115 of the inner casing 111 extends through the pipe connection 122 of the outer casing 112 and its end projects over pipe connection 122. Therefore, the closing element 116 of pipe connection 115 of the inner casing 111 is located outside the insulation space 113. A further difference in FIG. 2 compared with the first embodiment example in FIG. 1 consists in the closing member 134 which is constructed, for instance, as a plate, cap or the like and, in a manner analogous to closing member 24 in FIG. 1, can be fastened to pipe connection 115 by the application of heat, in particular by welding As in the first embodiment example shown in FIG. 1, the closing element 123 at pipe connection 122 of the outer casing 112 is constructed like closing member 124 in the form of a plate, cap or the like which can be fastened to pipe connection 122 in particular by welding, in this case, by electron beam welding. The closing member 124 is penetrated by pipe connection 115 of the inner casing 111 and accordingly forms an annular plate. It closes the annular space formed between the two pipe connections 155 and 122 and closes the insulation space 113. Further, a temporary closing member 135 contained in the annular space is indicated in dashes in FIG. 2.

The heat accumulator 110 shown in FIG. 2 is produced in the same manner as the heat accumulator 10 shown in FIG. 1. The insulation space 113 is first baked out and evacuated before introducing the storage medium. After baking out and evacuating the insulation space 113, the latter may be closed temporarily, if necessary, by the temporary closing member 135, e.g., to prevent any new impurities from entering. For the same reason, the insulation space 113 can, if required, also be filled with an inert substance which is prevented from escaping by the temporary closing member 135. As in the preceding embodiment example, the pipe connection 115 of the inner casing 111 is still accessible from the outside so that the storage medium can be introduced through the open pipe connection 115 in the manner described above after the insulation space 113 is baked out. The pipe connection 115 is then closed by the closing member 134. The insulation space 113 is then provided with the insulating layer, that is, either with vacuum insulation so that it is accordingly evacuated again or with insulating medium and additional vacuum. In the latter case, the insulating medium is preferably baked out separately and introduced into the evacuated insulation space 113 under vacuum, whereupon the insulation space 113 is closed so as to be vacuum-tight by the closing member 124.

In both embodiment examples shown in FIGS. 1 and 2, the introduction of an insulating medium into the respective insulation space 13 and 113 has the advantage that the insulating medium simultaneously supports the outer casing 12 or 112 maintained under vacuum relative to the inner casing 11 or 111 and accordingly contributes to mechanical stiffening.

It will be understood that each of the elements described above, or two or more together, may also find a useful application in other types of constructions and methods differing from the types described above.

While the invention has been illustrated and described as embodied in a heat accumulator and a method for manufacture of the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A heat accumulator, comprising an inner casing containing an accumulator core with a storage medium; an outer casing enclosing said inner casing at a distance thereto so as to form an insulation space, said inner casing having a pipe connection with a fill opening through which the storage medium is introducible; a mechanical closing element which closes said fill opening after the storage medium has been introduced, said outer casing also having a pipe connection with a fill opening through which said insulation space is fillable with an insulating medium or evacuatable; a mechanical closing element for closing said filling opening of said pipe connection of said outer casing, said pipe connection of said inner casing being disposed coaxially to said pipe connection of said outer casing, said pipe connection of said inner casing extending through said pipe connection of said outer casing and has an end projecting over said pipe connection of said outer casing, said closing element of said pipe connection of said inner casing being located outside said insulation space, said pipe connections forming an annular space therebetween, said closing element of said pipe connection of said outer casing being penetrated by said pipe connection of said inner casing and closing said annular space between said pipe connections; and an additional closing member which is insertable in said annular space between said pipe connections.

2. A heat accumulator as defined in claim 1, wherein each of said closing element is formed by a closing cap which is screwable on.

3. A heat accumulator as defined in claim 1, wherein each of said closing element is formed by a closing screw which is screwable in.

4. A heat accumulator as defined in claim 1; and further comprising a sealing element formed so as to provide vacuum-tight sealing and arranged between said pipe connection of said inner casing and said closing element of said pipe connection of said inner casing.

5. A heat accumulator as defined in claim 4, wherein said sealing element is formed as a sealing ring.

6. A heat accumulator as defined in claim 4, wherein said sealing element is composed of a non-hygroscopic plastic.

7. A heat accumulator as defined in claim 1, wherein at least one of said closing elements is formed as a closing member which is fastenable by application of heat.

8. A heat accumulator as defined in claim 7, wherein said closing member is formed as a member selected from the group consisting of a plate, a ring and a cap.

9. A heat accumulator as defined in claim 1, wherein said additional closing member is a temporary closing member.

* * * * *